United States Patent
Roger et al.

(10) Patent No.: US 9,503,350 B2
(45) Date of Patent: Nov. 22, 2016

(54) METHOD FOR MONITORING A COMMUNICATION BETWEEN A TRANSMITTER ENTITY AND A RECEIVER ENTITY

(71) Applicant: Schneider Electric Industries SAS, Rueil Malmaison (FR)

(72) Inventors: Mireille Roger, Ruelle-sur Touvre (FR); Alain Tardivon, Gourville (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 155 days.

(21) Appl. No.: 14/547,570

(22) Filed: Nov. 19, 2014

(65) Prior Publication Data
US 2015/0180756 A1    Jun. 25, 2015

(30) Foreign Application Priority Data
Dec. 20, 2013  (FR) ...................... 13 63168

(51) Int. Cl.
*H04L 12/26*    (2006.01)

(52) U.S. Cl.
CPC ......... *H04L 43/103* (2013.01); *H04L 43/0811* (2013.01)

(58) Field of Classification Search
CPC ........................ H04L 43/103; H04L 43/0811
See application file for complete search history.

(56) References Cited

U.S. PATENT DOCUMENTS

2001/0054158 A1    12/2001  Jarosz
2008/0126492 A1*   5/2008  Guidi ................... H04L 43/103
                                                                  709/206
2008/0165796 A1    7/2008  Martinez et al.
2014/0036794 A1*   2/2014  Koc ..................... H04W 24/04
                                                                  370/329

FOREIGN PATENT DOCUMENTS

GB          2 363 548       12/2001
WO    WO 2012/174934 A1    12/2012

OTHER PUBLICATIONS

French Preliminary Search Report issued Jun. 19, 2014 in French Application 13 63168, filed on Dec. 20, 2013 ( with English Translation of Categories of Cited Documents and Written Opinion).

* cited by examiner

*Primary Examiner* — Christopher Grey
(74) *Attorney, Agent, or Firm* — Oblon, McClelland, Maier & Neustadt, L.L.P.

(57) ABSTRACT

The invention relates to a method for monitoring a communication between a transmitter entity and a receiver entity. It consists of the transmission of diagnostic frames D dedicated to the monitoring of the communication. The objective of the monitoring is to ascertain the state of the communication before the next data communication frame C so as to be able to ensure that the latter has the maximum chance of taking place. Accordingly, at least one diagnostic frame D must be transmitted before the probable next transmission of a data communication frame C. The instant of transmission Tdiag[0] of the first diagnostic frame D is determined from the minimum period to be complied with between the transmission of two communication frames C. The instants of transmission Tdiag[i] of the diagnostic frames D which follow the first diagnostic frame transmitted at the instant Tdiag[0] are determined on the basis of an increasing function.

4 Claims, 4 Drawing Sheets

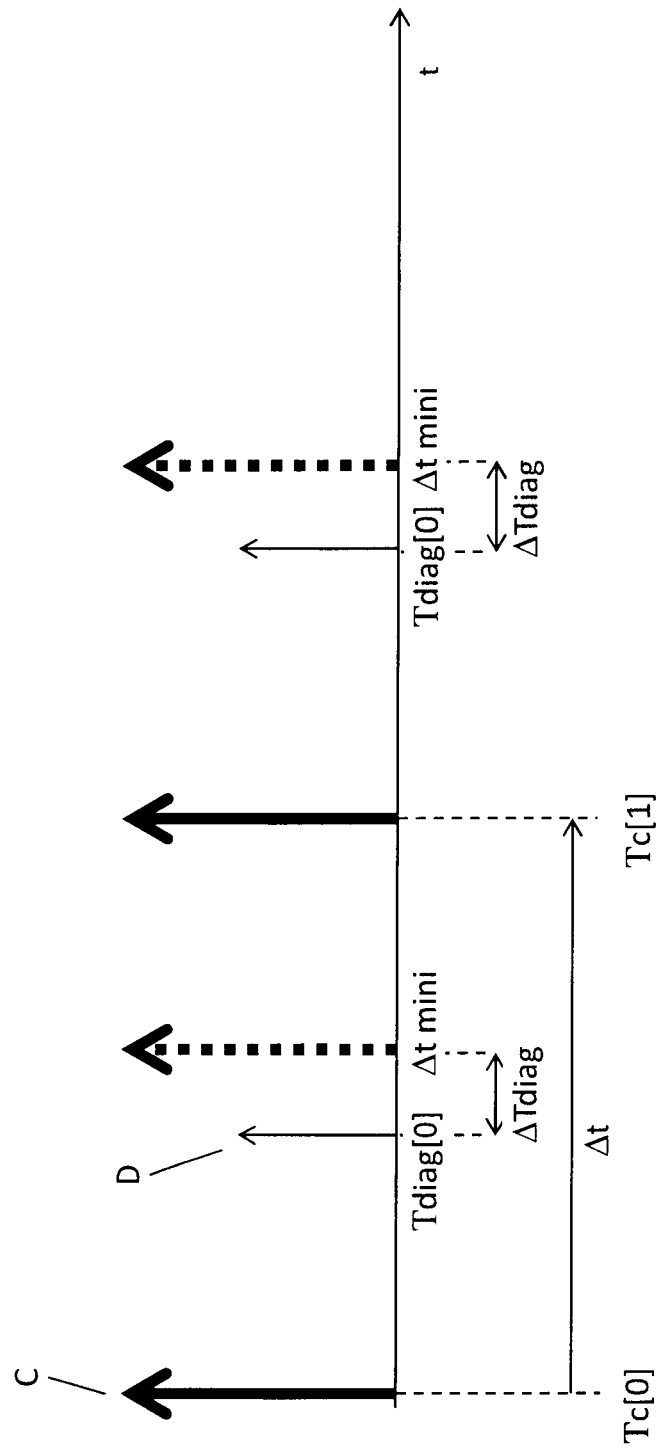

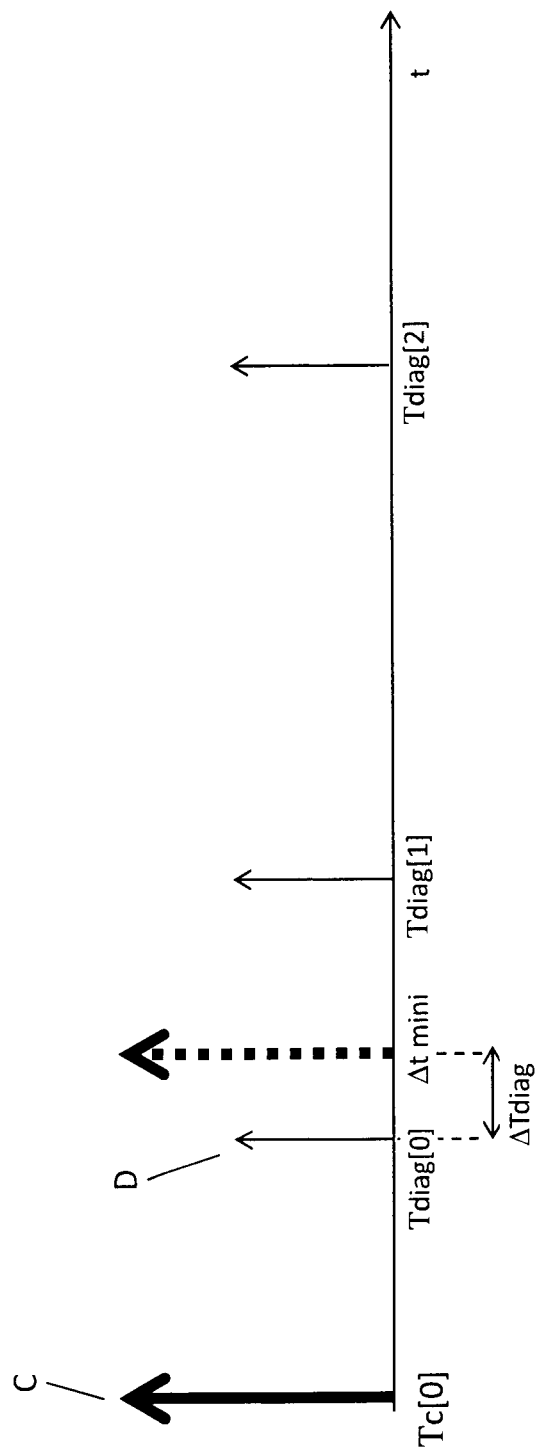

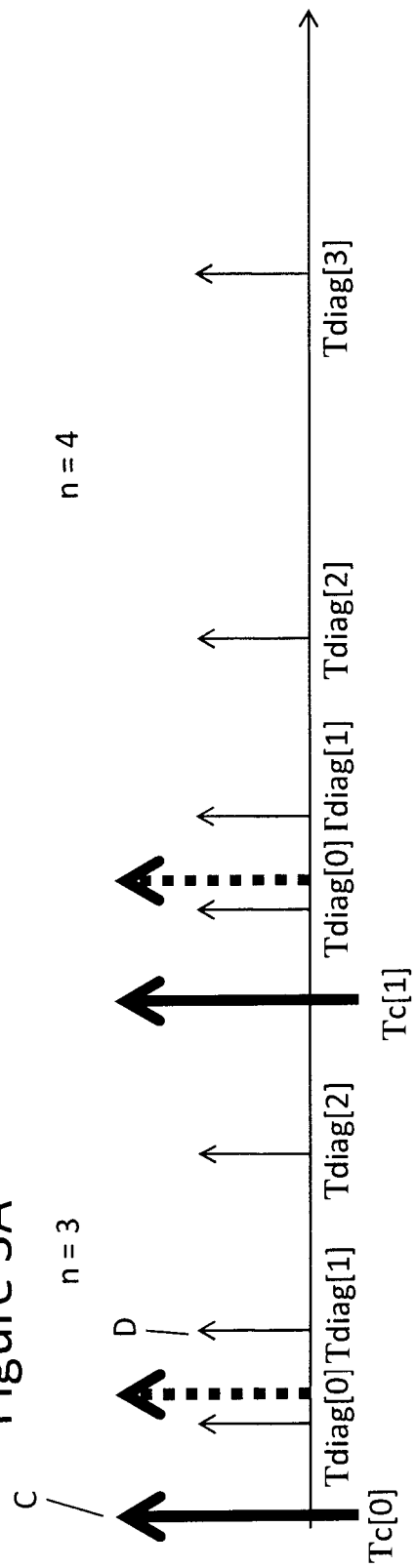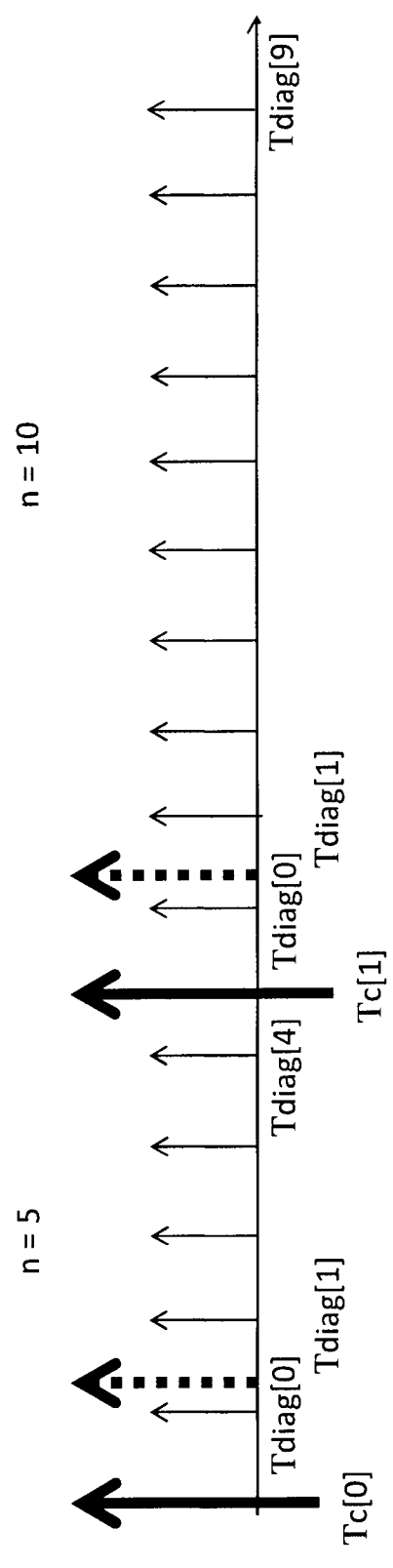

METHOD FOR MONITORING A COMMUNICATION BETWEEN A TRANSMITTER ENTITY AND A RECEIVER ENTITY

TECHNICAL FIELD OF THE INVENTION

The present invention pertains to a method for monitoring communication between a transmitter entity and a receiver entity.

PRIOR ART

In the industrial setting, communication between entities has to be reliable since it participates in the command-control of machines. Either the communication intrinsically displays a high level of reliability, which may turn out to be difficult to obtain, or it must be monitored so as to detect errors of communication between the entities. In this second case, this entails being able to transmit, in addition to the data communication frames exchanged between the entities, diagnostic frames so as to continually be certain of communication reliability. The transmission of diagnostic frames makes it possible to detect communication errors and thus to alert the entities to these errors. To make it possible to detect a communication error with maximum reliability, the easiest solution consists in transmitting diagnostic frames at a high frequency. However, the transmission of frames at a high frequency causes saturation of the communication link and overconsumption of electrical energy in respect of the entities involved.

The aim of the invention is to propose a method for monitoring a communication between a transmitter entity and a receiver entity, which makes it possible to guarantee reliability in the state of the communication of close to 100%, while avoiding saturating the communication link and avoiding causing overconsumption of electrical energy.

DISCLOSURE OF THE INVENTION

This aim is attained by a method for monitoring a communication between a transmitter entity and a receiver entity, said transmitter entity sending data communication frames to the receiver entity, the time elapsed between two data communication frames being at least equal to a minimum duration, said method being characterized in that it comprises the following steps:

Determination of an instant of transmission of a first diagnostic frame of rank 0 according to the following relation:

$$T\text{diag}[0] = \Delta t_{mini} - \Delta t\text{diag}$$

in which:
$\Delta t_{mini}$ corresponds to a minimum duration between the transmission of two communication frames,
$\Delta t\text{diag}$ corresponds to a duration to be complied with to obtain optimized reliability in the state of the communication,
Emission by the transmitter entity of said first diagnostic frame at the determined instant of transmission, destined for the receiver entity,
Determination on the basis of an increasing function of the instants of transmission $T\text{diag}[i]$ of the following diagnostic frames of rank i, said increasing function being chosen to obtain instants of transmission that are separated from one another by a variable duration,
Emission of said diagnostic frames of rank i by the transmitter entity destined for the receiver entity, as long as a new data communication frame has not been transmitted by, the transmitter entity.

According to a particular feature, the method comprises a step of limiting to a maximum value the duration between two successive diagnostic frames, when the duration between a first instant of transmission of a diagnostic frame of rank i and a second instant of transmission of a frame of rank i+1 exceeds said maximum value.

According to another particular feature, said maximum value corresponds to an average period of transmission of the data communication frames.

According to another particular feature, the value of $\Delta t\text{diag}$ is determined from the following relation:

$$\Delta t\text{diag} = \Delta t \frac{\text{Ln}(Fiab)}{\text{Ln}(1 - \tau_{failure})}$$

With:
Fiab which corresponds to the reliability sought,
$\tau_{failure}$ which corresponds to the rate of occurrence of failures of communication between two data communication frames,
$\Delta t$ which corresponds to the duration between two successive data communication frames.

BRIEF DESCRIPTION OF THE FIGURES

Other characteristics and advantages will become apparent in the detailed description which follows given with regard to the appended drawings in which:
FIGS. 1 and 2 illustrate the operating principle of the diagnostic method of the invention,
FIGS. 3A and 3B illustrate respectively the principle of the diagnostic method of the invention and that of a diagnostic method known in the prior art.

DETAILED DESCRIPTION OF AT LEAST ONE EMBODIMENT

Figure 4:
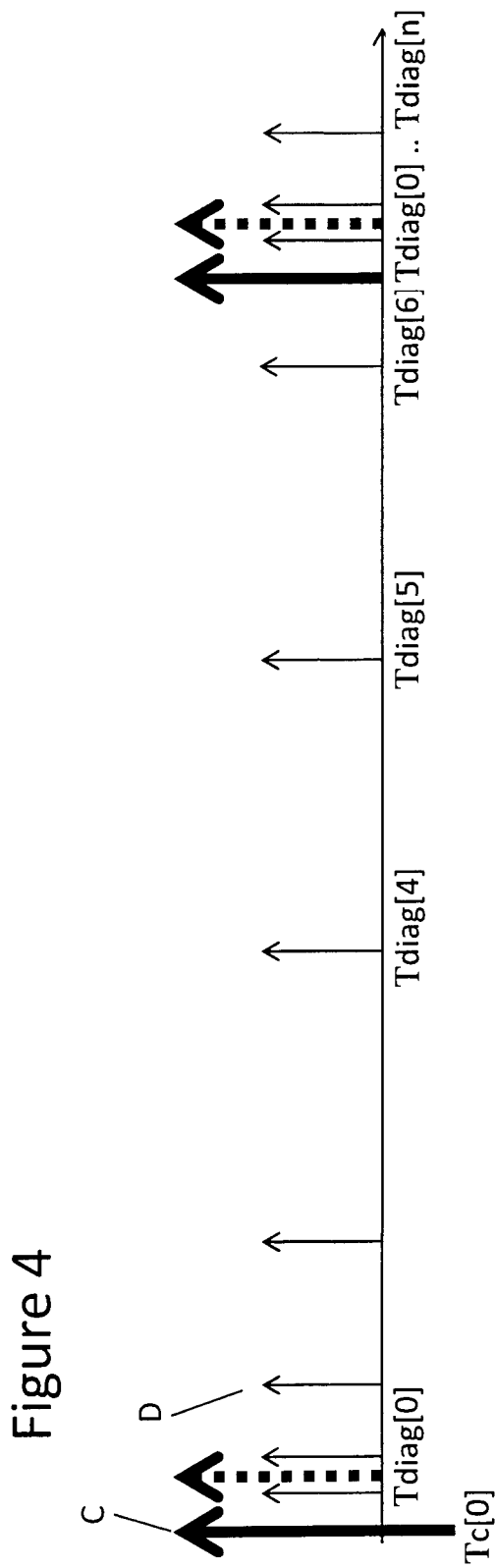
FIG. 4 illustrates the operating principle of the diagnostic method of the invention, according to a variant embodiment.

The method of the invention applies to an installation comprising at least one transmitter entity and one receiver entity connected together across a communication network of wired or wireless type. Of course, each of these entities will be able to discharge both functions, transmitter and receiver.

In this installation, the transmitter entity dispatches data communication frames C to the receiver entity, for example for the command-control of a machine. The period $\Delta t$ of transmission of the data communication frames C is not necessarily fixed.

The method of the invention consists in monitoring the communication between the transmitter entity and the receiver entity. It consists of the transmission of diagnostic frames D dedicated to the monitoring of the communication. The objective of the monitoring is to ascertain the state of the communication before the next data communication frame C so as to be able to ensure that the latter has the maximum chance of taking place. Accordingly, at least one diagnostic frame D must be transmitted before the probable next transmission of a data communication frame C. The instant of transmission $T\text{diag}[0]$ of the first diagnostic frame D is therefore determined from the minimum period to be complied with between the transmission of two data communication frames C, this being known to the transmitter entity. The instant of transmission Tdiag[0] of the first diagnostic frame is thus expressed by the following relation:

$$T\text{diag}[0]=\Delta t\text{mini}-\Delta t\text{diag} \quad (1)$$

In which:
Δtdiag is a duration determined so as to ensure reliability in the state of the communication of close to 100%
Δtmini corresponds to the minimum period to be complied with between two data communication frames.

In the appended figures, the end of the period Δtmini is represented by a dotted vertical arrow. This instant of transmission does not correspond to the transmission of a data communication frame C but to the instant from which a data communication frame C could be transmitted.

The value Δtdiag is determined by the following relation:

$$\Delta t\text{diag} = \Delta t \frac{\text{Ln}(Fiab)}{\text{Ln}(1-\tau_{failure})} \quad (2)$$

In which:
Δt corresponds to the period of transmission of the data communication frames C,
Fiab corresponds to the reliability rate sought for the communication, for example 99%,
$\tau_{failure}$ corresponds to the probability of occurrence of a communication failure. Between 2 transmissions of data communication frames C (Δt), the value of this failure rate is considered constant.

As long as a data communication frame C has not been dispatched by the transmitter entity, the latter dispatches diagnostic frames D to the receiver entity. Preferably, the diagnostic frames D are transmitted at a variable frequency, making it possible to avoid saturation of the communication and overconsumption of energy on the part of the entities.

The instants of transmission of the diagnostic frames D, which follow the first diagnostic frame transmitted at the instant Tdiag[0], are determined on the basis of an increasing function such as for example a geometric progression chosen to obtain instants of transmission separated by a variable duration. The increasing function making it possible to determine the instants of transmission Tdiag[i] of the diagnostic frames of rank i (with i>0) is for example the following geometric progression:

$$T\text{diag}[i]=r(i)\times T\text{diag}[i-1] \quad (3)$$

In which r(i) corresponds to the common ratio of the progression.

This increasing function makes it possible to alter the duration between two diagnostic frames D, before the transmission of the next data communication frame C, while ensuring maximum reliability (of close to 100%). With the duration between the last data communication frame and the next data communication frame increasing, the incidence of a communication failure decreases since this rate is considered constant between 2 data communication frames C. Hence, even if the diagnostic frames are further and further apart, the reliability in the state of the communication remains high, close to 100%. As long as a data communication frame C has not been transmitted by the transmitter entity, diagnostic frames D are transmitted at the instants of transmission Tdiag[i] determined by virtue of relation (3) hereinabove.

After each data communication frame C transmission, the diagnostic method is reinitialized and the instant of transmission of the next diagnostic frame D, corresponding to Tdiag[0], is determined by virtue of relation (1) hereinabove and the following instants Tdiag[i] are determined by virtue of relation (3).

FIG. 1 illustrates the transmission of a first data communication frame and the transmission of a diagnostic frame at the instant Tdiag[0] determined from relation (1) hereinabove. In this FIG. 1, a second communication frame C is transmitted before the transmission of a second diagnostic frame.

In FIG. 2, diagnostic frames are transmitted at the instants of transmission Tdiag[1] and Tdiag[2] determined from relation (3) hereinabove. In this figure, it is clear that the frequency of transmission between the diagnostic frames is not fixed.

FIGS. 3A and 3B make it possible to compare the solution of the invention with a solution of the prior art, in which diagnostic frames are transmitted at a fixed frequency. In FIG. 3A, corresponding to the method of the invention, the monitoring is carried out with just the transmission of three diagnostic frames (n=3) between the first two communication frames. In FIG. 3B, corresponding to the solution of the prior art, for one and the same communication reliability rate, five diagnostic frames (n=5) must be transmitted over the same period in order to monitor the communication. Over a longer period between two data communication frames, four diagnostic frames (n=4) are necessary within the context of the invention whereas ten diagnostic frames (n=10) will be useful in the fixed-frequency solution of the prior art.

According to the invention, if the duration between two diagnostic frames D becomes too long, it can be capped at a determined value. This value will be for example the average period of transmission of the data communication frames. FIG. 4 illustrates such a solution in which the instants of transmission Tdiag[4], Tdiag[5] and Tdiag[6] are transmitted at a fixed period, the latter corresponding to a maximum value, which can be stored in memory for example by the transmitter entity.

The invention thus presents several advantages, especially:
Of guaranteeing reliability in the state of the communication of close to 100%, while avoiding saturating the communication link and avoiding causing overconsumption of electrical energy,
Of adapting the frequency of transmission of the diagnostic frames to the frequency of transmission of the data communication frames,
Of being simple to implement and of being able to adapt to communication networks of wired or wireless type.

The invention claimed is:
1. A method for monitoring a communication between a transmitter entity and a receiver entity, said transmitter entity sending data communication frames to the receiver entity, the time elapsed between two data communication frames being at least equal to a minimum duration, said method comprising the following steps:
determining an instant of transmission $T_{diag}[0]$ of a first diagnostic frame of rank 0 according to the following relation:

$$T\text{diag}[0]=\Delta t_{mini}-\Delta t\text{diag}$$

where:
$\Delta t_{mini}$ corresponds to a minimum duration between the transmission of two communication frames, Δtdiag corresponds to a duration to be complied with to obtain optimized reliability in the state of the communication, emitting by the transmitter entity of said first diagnostic frame at the determined instant of transmission, destined for the receiver entity, determining on the basis of an increasing function of the instants of transmission Tdiag[i] of the following diagnostic frames of rank i, said increasing function being chosen to obtain instants of transmission that are separated from one another by a variable duration, and emitting said diagnostic frames of rank i by the transmitter entity destined for the receiver entity, as long as a new data communication frame has not been transmitted by the transmitter entity.

2. The method according to claim 1, further comprising a step of limiting to a maximum value the duration between two successive diagnostic frames, when the duration between a first instant of transmission of a diagnostic frame of rank i and a second instant of transmission of a frame of rank i+1 exceeds said maximum value.

3. The method according to claim 2, wherein said maximum value corresponds to an average period of transmission of the data communication frames.

4. The method according to claim 1, wherein Δtdiag is determined from the following relation:

$$\Delta t \text{diag} = \Delta t \frac{\text{Ln}(Fiab)}{\text{Ln}(1 - \tau_{failure})}$$

Where:

Fiab corresponds to the reliability sought, $\tau_{failure}$ corresponds to the rate of occurrence of failures of communication between two data communication frames, and Δt corresponds to the duration between two successive data communication frames.

* * * * *